United States Patent
Hosokawa

(10) Patent No.: US 10,882,484 B2
(45) Date of Patent: Jan. 5, 2021

(54) OCCUPANT DETECTION APPARATUS

(71) Applicant: DENSO CORPORATION, Kariya (JP)

(72) Inventor: Toshio Hosokawa, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 37 days.

(21) Appl. No.: 16/274,610

(22) Filed: Feb. 13, 2019

(65) Prior Publication Data

US 2019/0256028 A1  Aug. 22, 2019

(30) Foreign Application Priority Data

Feb. 21, 2018 (JP) ................................ 2018-029048

(51) Int. Cl.
| | |
|---|---|
| *B60R 21/015* | (2006.01) |
| *B60N 2/00* | (2006.01) |
| *G06T 1/00* | (2006.01) |
| *B60R 21/16* | (2006.01) |

(52) U.S. Cl.
CPC ........ *B60R 21/01538* (2014.10); *B60N 2/002* (2013.01); *B60R 21/16* (2013.01); *G06T 1/0007* (2013.01)

(58) Field of Classification Search
CPC ............ B60R 21/015; B60R 21/01538; B60R 21/01552; G06K 9/00832; G06K 9/00838; G06K 9/2027
See application file for complete search history.

(56) References Cited

U.S. PATENT DOCUMENTS

| | | | | |
|---|---|---|---|---|
| 7,388,691 B2* | 6/2008 | Wang | ...................... | H04N 1/04 |
| | | | | 250/208.1 |
| 2004/0220705 A1* | 11/2004 | Basir | ................. | B60R 21/01538 |
| | | | | 701/1 |
| 2006/0012679 A1* | 1/2006 | Ressler | ............. | B60R 21/01538 |
| | | | | 348/148 |
| 2006/0161321 A1* | 7/2006 | Bothe | .................... | B60N 2/002 |
| | | | | 701/45 |
| 2009/0033075 A1* | 2/2009 | Yoshifuku | ......... | B60R 21/01538 |
| | | | | 280/730.1 |
| 2017/0124987 A1* | 5/2017 | Kim | ........................ | B60R 11/04 |
| 2017/0334357 A1* | 11/2017 | Lewis | .................. | G06K 9/3233 |
| 2018/0211123 A1* | 7/2018 | Yasuda | .................. | H04N 5/232 |
| 2019/0279008 A1* | 9/2019 | Abhau | .................... | G06T 15/04 |

FOREIGN PATENT DOCUMENTS

| | | |
|---|---|---|
| JP | 2002-008021 A | 1/2002 |
| JP | 2003-025911 A | 1/2003 |
| JP | 2011-116219 A | 6/2011 |
| JP | 2014-223887 A | 12/2014 |
| JP | 2016-055847 A | 4/2016 |

* cited by examiner

Primary Examiner — Frank B Vanaman
(74) Attorney, Agent, or Firm — Maschoff Brennan

(57) ABSTRACT

An occupant detection apparatus includes a first camera and a second camera. The first camera is arranged in a passenger compartment of a vehicle to capture images within a first field of view in the passenger compartment. The second camera is arranged at a different position in the passenger compartment from the first camera to capture images within a second field of view in the passenger compartment. The second field of view is different from the first field of view. Moreover, the first camera is arranged within the second field of view which is the field of view of the second camera. On the other hand, the second camera is arranged within the first field of view which is the field of view of the first camera.

4 Claims, 4 Drawing Sheets

OCCUPANT DETECTION APPARATUS

CROSS-REFERENCE TO RELATED APPLICATION

This application is based on and claims priority from Japanese Patent Application No. 2018-29048 filed on Feb. 21, 2018, the contents of which are hereby incorporated by reference in their entirety into this application.

BACKGROUND

1 Technical Field

The present disclosure relates to occupant detection apparatuses used in vehicles.

2 Description of Related Art

There are known occupant detection apparatuses that are configured to detect, for each seat of a vehicle, the presence or absence, build and posture of an occupant on the seat. These apparatuses generally employ a load sensor or a camera for performing the detection.

For example, Japanese Patent Application Publication No. JP2002008021A discloses an occupant detection apparatus that is configured to detect, for each seat of a vehicle, the presence or absence, build and posture of an occupant on the seat on the basis of image data captured by a CCD (Charge-Coupled Device) camera.

However, with the occupant detection apparatus disclosed in the above patent document, there are cases where the field of view of the camera is obstructed by an obstruction such as a hand of an occupant in the vehicle. In these cases, it will become impossible for the occupant detection apparatus to accurately detect, for each seat of the vehicle, the presence or absence, build and posture of an occupant on the seat.

Moreover, in the case of controlling, based on the occupant detection results, the drive of an occupant protection device such as an airbag, when the occupant detection cannot be accurately performed, it is then necessary to perform a self-diagnosis process of the occupant detection apparatus or an abnormality handling process (e.g., a process of notifying occupants in the vehicle of the fact that the field of view of the camera is obstructed by an obstruction). However, frequently performing the self-diagnosis process even when the field of view of the camera is only temporarily obstructed (e.g., by a hand of an occupant in the vehicle) will make occupants in the vehicle feel uncomfortable; frequently performing the abnormality handling process even when the field of view of the camera is only temporarily obstructed will cause inconvenience to the occupants.

SUMMARY

According to the present disclosure, there is provided an occupant detection apparatus which includes a first camera and a second camera. The first camera is arranged in a passenger compartment of a vehicle to capture images within a first field of view in the passenger compartment. The second camera is arranged at a different position in the passenger compartment from the first camera to capture images within a second field of view in the passenger compartment. The second field of view is different from the first field of view. Moreover, the first camera is arranged within the second field of view which is the field of view of the second camera. On the other hand, the second camera is arranged within the first field of view which is the field of view of the first camera.

With the above configuration, the second camera is arranged within the first field of view which is the field of view of the first camera. Therefore, when the field of view of the second camera is obstructed by an obstruction, the obstruction will be present within the first field of view and thus the first camera can reliably capture images of the obstruction. Consequently, based on the images captured by the first camera, it is possible to reliably detect the obstruction obstructing the field of view of the second camera.

Moreover, the first camera is arranged within the second field of view which is the field of view of the second camera. Therefore, when the field of view of the first camera is obstructed by an obstruction, the obstruction will be present within the second field of view and thus the second camera can reliably capture images of the obstruction. Consequently, based on the images captured by the second camera, it is possible to reliably detect the obstruction obstructing the field of view of the first camera.

That is, with the above configuration, the first and second cameras are arranged in the passenger compartment of the vehicle so that each of the first and second cameras is included in the field of view of the other of the first and second cameras. Therefore, when the field of view of one of the first and second cameras is obstructed by an obstruction, the other of the first and second cameras can reliably capture images of the obstruction. Consequently, based on the images captured by the other of the first and second cameras, it is possible to reliably detect the obstruction obstructing the field of view of the one of the first and second cameras. Moreover, it is also possible to accurately determine whether or not the obstruction is caused by an occupant in the passenger compartment (e.g., the obstruction is a part of the body of an occupant in the passenger compartment). As a result, it is possible to improve both the reliability and accuracy of the occupant detection by the occupant detection apparatus.

DESCRIPTION OF EXEMPLARY EMBODIMENT

An exemplary embodiment and its modifications will be described hereinafter with reference to FIGS. 1-6.

(Overall Configuration of Vehicle)

Figure 1:
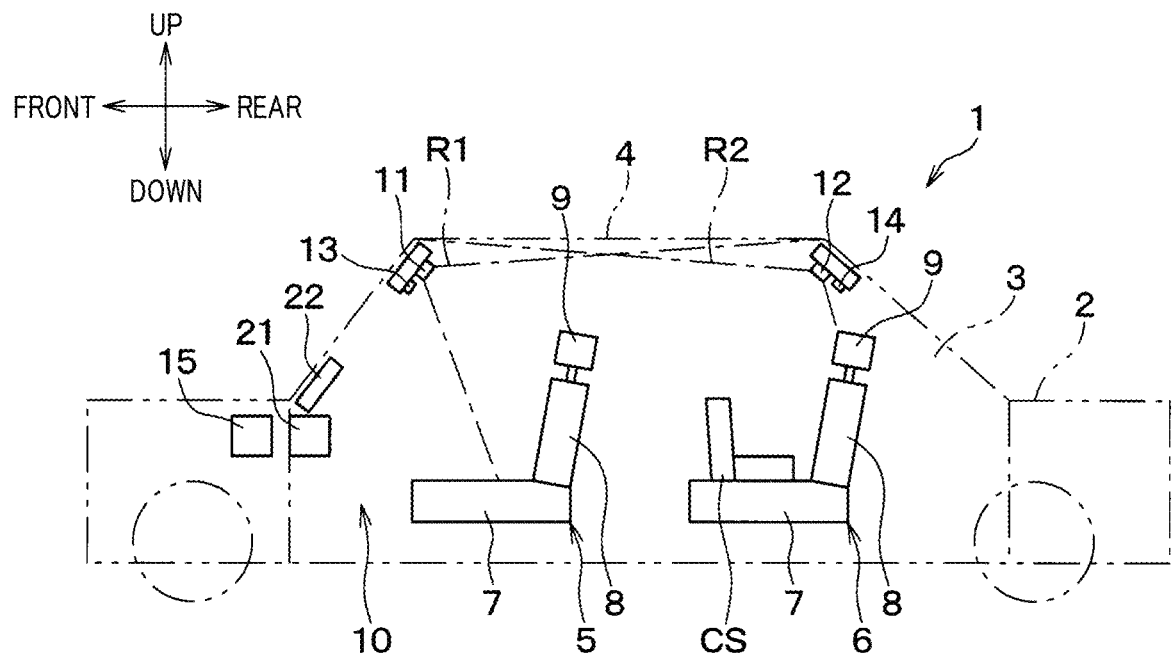
FIG. 1 is a schematic side view illustrating the overall configuration of a vehicle that is equipped with an occupant detection apparatus according to an exemplary embodiment.

FIG. 1 shows the overall configuration of a vehicle 1 that is equipped with an occupant detection apparatus 10 according to the exemplary embodiment. The vehicle 1 is an automobile having, for example, a box-shaped vehicle body 2.

It should be noted that for the sake of convenience of explanation, the terms "front", "rear", "up" and "down" used hereinafter are defined as indicated with arrows in FIG. 1. It also should be noted that: the front-rear direction coincides with a longitudinal direction of the vehicle 1; the up-down direction coincides with a height direction of the vehicle 1; and the left-right direction perpendicular to both the front-rear direction and the up-down direction coincides with a lateral direction of the vehicle 1.

The vehicle 1 has a passenger compartment 3 which is formed in the vehicle body 2 and in which occupants can be seated. The passenger compartment 3 is covered by a ceiling 4 on the upper side. In the passenger compartment 3, there are provided a pair of front seats 5 and a single rear seat 6.

Specifically, the front seats 5 are arranged in a front part of the passenger compartment 3. The front seats 5 consist of a driver's seat and a front passenger seat. Each of the front seats 5 includes a seat base 7, a seat back 8 and a head rest 9. The seat back 8 extends from the seat base 7 upward and slightly backward. The head rest 9 is mounted to an upper end portion of the seat back 8.

The rear seat 6 is arranged on the rear side of the front seats 5 in the passenger compartment 3. Similar to the front seats 5, the rear seat 6 includes a seat base 7, a seat back 8 and a head rest 9. The seat base 7 of the rear seat 6 is formed in a rectangular shape with its longitudinal direction coinciding with the lateral direction of the vehicle 1. The rear seat 6 is configured to allow two or three occupants to be seated thereon.

Moreover, each of the front passenger seat 5 and the rear seat 6 is configured to allow a forward-facing or backward-facing child seat CS to be attached thereto and detached therefrom. A forward-facing child seat CS is configured to have, in an attached state thereof, an infant seated thereon facing forward. In contrast, a backward-facing child seat CS is configured to have, in an attached state thereof, an infant seated thereon facing backward. In addition, in FIG. 1, there is shown a backward-facing child seat CS attached to the rear seat 6.

The occupant detection apparatus 10 is mounted to the vehicle body 2 to detect, for each of the front and rear seats 5 and 6 of the vehicle 1, the presence or absence, build and posture of an occupant on the seat.

(Configuration of Occupant Detection Apparatus)

Figure 2:
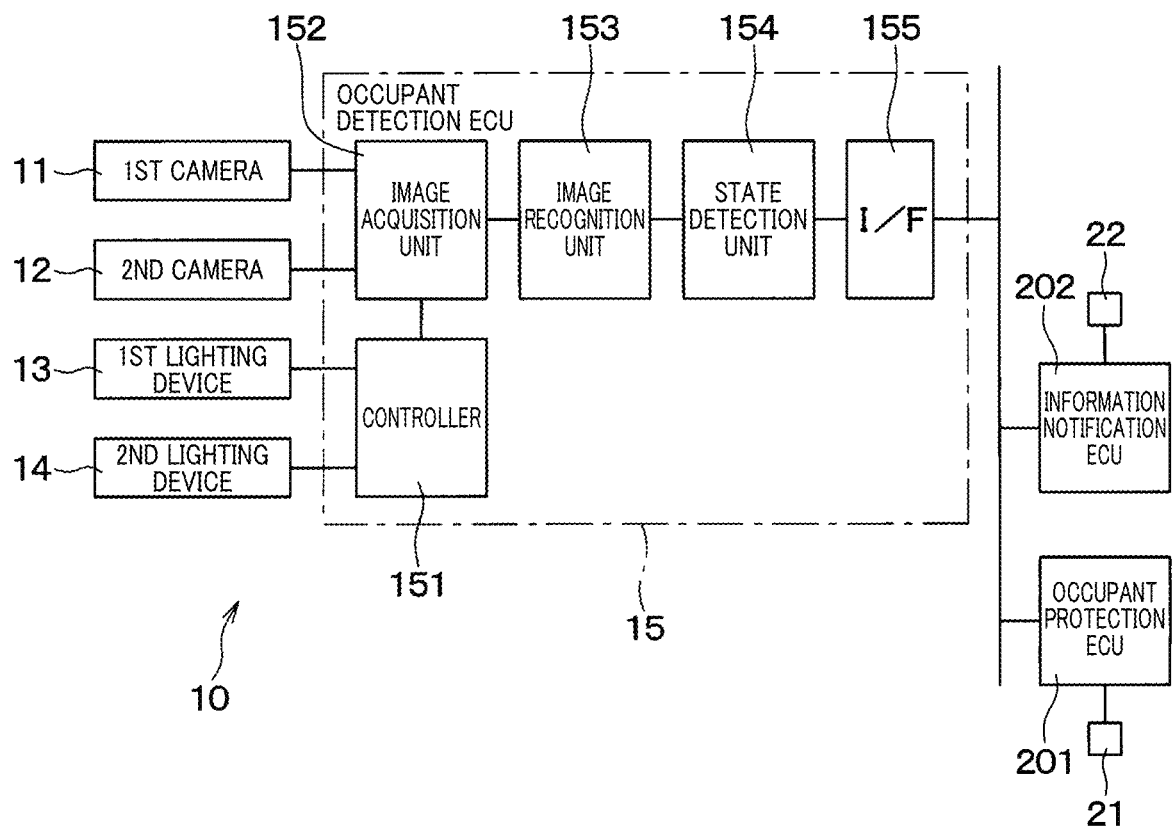
FIG. 2 is a schematic block diagram illustrating the configuration of the occupant detection apparatus.

As shown in FIG. 2, the occupant detection apparatus 10 according to the present embodiment includes a first camera 11, a second camera 12, a first lighting device 13, a second lighting device 14 and an occupant detection ECU (Electronic Control Unit) 15.

The first and second cameras 11 and 12 are arranged in the passenger compartment 3 to capture images of the interior of the passenger compartment 3. Each of the first and second cameras 11 and 12 includes an image sensor such as a CCD (Charge-Coupled Device) sensor or a CMOS (Complementary Metal-Oxide Semiconductor) sensor. Moreover, each of the first and second cameras 11 and 12 is configured to generate and output image data indicative of the captured images.

In the present embodiment, as shown in FIG. 1, the first camera 11 is arranged in a front and laterally-central part of the passenger compartment 3. The first camera 11 is provided to capture images within a first field of view R1. The first field of view R1 includes, at least, the front seats 5, that part of the rear seat 6 which is not shielded by the front seats 5, and the second camera 12. However, the first field of view R1 does not include a central part of the ceiling 4 in the lateral direction of the vehicle 1; in the central part of the ceiling 4, there may be provided a sunroof (not shown). More particularly, in the present embodiment, the first camera 11 is provided in the vicinity of a rear-view mirror (not shown) fixed to a front end portion of the ceiling 4.

On the other hand, the second camera 12 is arranged at a different position from the first camera 11 in the passenger compartment 3. Specifically, the second camera 12 is arranged, at a rear end portion of the ceiling 4 and above the rear seat 6, toward the seat base 7 of the rear seat 6 so as to have the seat base 7 of the rear seat 6 included in its field of view.

That is, the second camera 12 is arranged in a rear and laterally-central part of the passenger compartment 3. The second camera 12 is provided to capture images within a second field of view R2 that is different from the first field of view R1. The second field of view R2 includes, at least, the seat base 7 of the rear seat 6 and the first camera 11. More particularly, in the present embodiment, the second field of view R2 includes a range in the longitudinal direction of the vehicle 1 from the seat back 8 of the rear seat 6 to the above-described rear-view mirror. However, the second field of view R2 does not include the central part of the ceiling 4 in the lateral direction of the vehicle 1, where a sunroof may be provided as described above.

Accordingly, in the present embodiment, the first camera 11 can detect occupants seated on the front seats 5 and the rear seat 6. On the other hand, the second camera 12 can detect mainly occupants seated on the rear seat 6. Moreover, the first camera 11 is arranged within the second field of view R2 which is the field of view of the second camera 12. On the other hand, the second camera 12 is arranged within the first field of view R1 which is the field of view of the first camera 11. That is, the first and second cameras 11 and 12 are arranged so that each of the first and second cameras 11 and 12 is included in the field of view of the other of the first and second cameras 11 and 12.

The first lighting device 13 is provided to illuminate (or light) the first field of view R1. Specifically, the first lighting device 13 is arranged in the vicinity of the first camera 11. More particularly, in the present embodiment, the first lighting device 13 is mounted to a housing of the first camera 11.

Similarly, the second lighting device 14 is provided to illuminate (or light) the second field of view R2. Specifically, the second lighting device 14 is arranged in the vicinity of the second camera 12. More particularly, in the present embodiment, the second lighting device 14 is mounted to a housing of the second camera 12.

The occupant detection ECU 15 is provided to control operation of the entire occupant detection apparatus 10. The occupant detection ECU 15 is constituted of a microcomputer that includes a CPU, a ROM, a RAM and a nonvolatile RAM, all of which are not shown in the figures. The nonvolatile RAM is, for example, a flash memory.

The CPU retrieves programs from the ROM or the nonvolatile RAM and executes the programs, thereby realizing various control operations of the occupant detection ECU 15. In addition, in the ROM or the nonvolatile RAM, there are also stored in advance various data necessary for the execution of the programs. The various data include, for example, initial values, lookup tables and maps.

The vehicle 1 is further equipped with, in addition to the occupant detection apparatus 10, an occupant protection apparatus 21 and an information notification apparatus 22 both of which operate according to the results of the occupant detection by the occupant detection apparatus 10.

In addition, though not shown in the figures, the occupant protection apparatus 21 includes an airbag mechanism and a belt pretensioner mechanism; the information notification apparatus 22 includes a display mechanism mounted to an instrument panel provided in the passenger compartment 3 and an audio output mechanism.

(Configuration of Occupant Detection ECU)

As shown in FIG. 2, the occupant detection ECU 15 includes, as functional blocks that are realized by the microcomputer constituting the occupant detection ECU 15, a controller 151, an image acquisition unit 152, an image recognition unit 153, a state detection unit 154 and a communication interface (abbreviated to I/F in FIG. 2) 155.

The controller 151 controls operation of the first and second lighting devices 13 and 14. Moreover, the controller 151 also controls the acquisition of the image data from the first and second cameras 11 and 12 by the image acquisition unit 152. The image acquisition unit 152, which is an image memory, stores the image data acquired from the first and second cameras 11 and 12 under control by the controller 151. In addition, the controller 151 performs a self-diagnosis process of the occupant detection apparatus 10; the self-diagnosis process will be described in detail latter.

In the present embodiment, the controller 151 inhibits the second lighting device 14 from illuminating the second field of view R2 when the first camera 11 captures images within the first field of view R1 with the first lighting device 13 illuminating the first field of view R1. Moreover, the controller 151 also inhibits the first lighting device 13 from illuminating the first field of view R1 when the second camera 12 captures images within the second field of view R2 with the second lighting device 14 illuminating the second field of view R2.

The image recognition unit 153 recognizes the images captured by the first and second cameras 11 and 12 by processing the image data stored in the image acquisition unit 152.

The state detection unit 154 detects the internal state of the passenger compartment 3 on the basis of the results of the image recognition by the image recognition unit 153.

The internal state of the passenger compartment 3 detected by the state detection unit 154 includes the occupant state in the passenger compartment 3. The occupant state is represented by the presence or absence, builds and postures of occupants on the front and rear seats 5 and 6 of the vehicle 1. The occupant state may also be referred to as the "seated state". Moreover, the internal state of the passenger compartment 3 detected by the state detection unit 154 also includes whether or not the fields of view of the first and second cameras 11 and 12 are obstructed by obstructions and the types of the obstructions.

Specifically, in the present embodiment, the state detection unit 154 detects any obstructions obstructing the field of view of one of the first and second cameras 11 and 12 on the basis of the results of the recognition by the image recognition unit 153 of the images captured by the other of the first and second cameras 11 and 12.

Moreover, when the detected obstructions are not caused by occupants in the passenger compartment 3, the state detection unit 154 determines that the self-diagnosis process of the occupant detection apparatus 10 or an abnormality handling process should be performed. Accordingly, the state detection unit 154 requests the controller 151 to perform the self-diagnosis process or the abnormality handling process.

In addition, "obstructions caused by occupants" include parts (e.g., hands) of the bodies of occupants in the passenger compartment 3 as well as clothes and hats (or caps) worn by occupants in the passenger compartment 3.

On the other hand, when the detected obstructions are caused by occupants in the passenger compartment 3, the state detection unit 154 determines that the abnormality handling process should be performed if the field of view has been continuously obstructed by the detected obstructions for at least a predetermined time. Accordingly, the state detection unit 154 requests the controller 151 to perform the abnormality handling process on condition that the field of view has been continuously obstructed by the detected obstructions for at least the predetermined time.

The abnormality handling process typically includes an abnormality notification process for notifying the occupants in the passenger compartment 3 of the abnormality. Further, the abnormality notification process includes a warning process for warning the occupants, for example, "do not obstruct the camera with your hand". In addition, the abnormality handling process may further include, for example, an abnormality informing process for informing other ECUs provided in the vehicle 1 which utilize the occupant detection results, such as an occupant protection ECU 201, of the abnormality.

The occupant detection ECU 15 is connected, via the communication interface 155, with an in-vehicle communication network so as to communicate information with the in-vehicle communication network. The in-vehicle communication network is constructed in accordance with in-vehicle LAN (Local Area Network) standards such as CAN (Controller Area Network; an international registered trademark).

The occupant detection ECU 15 is also connected, via the in-vehicle communication network, with the aforementioned occupant protection ECU 201 and an information notification ECU 202 so as to communicate information with the ECUs 201 and 202. The occupant protection ECU 201 is provided to control operation of the occupant protection apparatus 21. The information notification ECU 202 is provided to control operation of the information notification apparatus 22.

(Operational Effects of Occupant Detection Apparatus)

In the occupant detection apparatus 10 according to the present embodiment, the first camera 11 captures images within the first field of view R1 in the passenger compartment 3. Specifically, the first camera 11 captures images of the inside of the passenger compartment 3 from the front and upper part of the passenger compartment 3 backward. Therefore, almost the entire upper bodies of occupants seated on the front seats 5 of the vehicle 1 are included in the field of view of the first camera 11. Consequently, with the first camera 11, it is possible to detect the occupant state at the front seats 5.

On the other hand, those parts of the passenger compartment 3 which are close to the seat base 7 of the rear seat 6 and to either of the lateral ends of the passenger compartment 3 will become blind spots of the first camera 11 due to the presence of the front seats 5 and the occupants seated on the front seats 5. However, the upper and laterally-central part of the seat back 8 of the rear seat 6 can be imaged by the first camera 11. Therefore, when adult occupants with an average build are seated on the rear seat 6, it is possible to detect, with the first camera 11, the occupant state at the rear seat 6 regardless of the seated positions of the occupants on the rear seat 6. Moreover, it is also possible to detect, with the first camera 11, the occupant state at the laterally-central part of the rear seat 6 regardless of the builds of the occupants seated on the laterally-central part.

The second camera 12 captures images within the second field of view R2 in the passenger compartment 3. Specifically, the second camera 12 captures images of the inside of the passenger compartment 3 from the upper side of the rear seat 6 downward. Therefore, the entire rear seat 6 is included in the field of view of the second camera 12. Consequently, with the second camera 12, it is possible to detect the occupant state at the rear seat 6.

Moreover, in the case where a backward-facing child seat CS is attached to the rear seat 6 as shown in FIG. 1, it is difficult to capture images of an infant seated on the child seat CS with the first camera 11. This is because the infant is shielded by the child seat CS, or the front seats 5 and the occupants seated on the front seats 5.

In consideration of the above, in the present embodiment, the second camera 12 is arranged above the rear seat 6 to have the seat base 7 of the rear seat 6 included in the field of view thereof. Consequently, with the second camera 12, it is possible to reliably detect the presence or absence of an infant on the backward-facing child seat CS attached to the rear seat 6.

Furthermore, the field of view of the first camera 11 may be temporarily obstructed by, for example, a hand of the vehicle driver during the adjustment of the direction of the rear-view mirror by the vehicle driver. On the other hand, the field of view of the second camera 12 may be temporarily obstructed by, for example, an occupant seated on the rear seat 6, depending on the posture of the occupant. In the above cases, frequently performing the self-diagnosis process of the occupant detection apparatus 10 will make occupants in the passenger compartment 3 feel uncomfortable; frequently performing the abnormality handling process (e.g., the abnormality notification process) will cause inconvenience to the occupants.

In consideration of the above, in the present embodiment, the second camera 12 is arranged within the first field of view R1 which is the field of view of the first camera 11. Therefore, when the field of view of the second camera 12 is obstructed by an obstruction, the obstruction will be present within the first field of view R1 and thus the first camera 11 can reliably capture images of the obstruction. Consequently, based on the images captured by the first camera 11, it is possible to reliably detect the obstruction obstructing the field of view of the second camera 12.

Moreover, in the present embodiment, the first camera 11 is arranged within the second field of view R2 which is the field of view of the second camera 12. Therefore, when the field of view of the first camera 11 is obstructed by an obstruction, the obstruction will be present within the second field of view R2 and thus the second camera 12 can reliably capture images of the obstruction. Consequently, based on the images captured by the second camera 12, it is possible to reliably detect the obstruction obstructing the field of view of the first camera 11.

As above, in the present embodiment, the first and second cameras 11 and 12 are arranged in the passenger compartment 3 so that each of the first and second cameras 11 and 12 is included in the field of view of the other of the first and second cameras 11 and 12. Therefore, when the field of view of one of the first and second cameras 11 and 12 is obstructed by an obstruction, the other of the first and second cameras 11 and 12 can reliably capture images of the obstruction. Consequently, based on the images captured by the other of the first and second cameras 11 and 12, it is possible to reliably detect the obstruction obstructing the field of view of the one of the first and second cameras 11 and 12. As a result, it is possible to improve the reliably of the occupant detection by the occupant detection apparatus 10.

More specifically, in the present embodiment, the state detection unit 154 detects the obstruction obstructing the field of view of the one of the first and second cameras 11 and 12 on the basis of the results of the recognition by the image recognition unit 153 of the images captured by the other of the first and second cameras 11 and 12. Consequently, it is possible for the state detection unit 154 to accurately determine whether or not the obstruction is caused by an occupant in the passenger compartment 3.

Moreover, when the obstruction is not caused by an occupant in the passenger compartment 3, the state detection unit 154 determines that the self-diagnosis process of the occupant detection apparatus 10 or the abnormality handling process should be performed. Accordingly, the state detection unit 154 requests the controller 151 to perform the self-diagnosis process or the abnormality handling process. Consequently, when the obstruction is caused by, for example, substances adhered to the one of the first and second cameras 11 and 12, it is possible for the controller 151 to promptly perform the self-diagnosis process or the abnormality handling process. In other words, it is possible to perform the self-diagnosis process or the abnormality handling process in a timely manner.

In contrast, when the obstruction is caused by an occupant in the passenger compartment 3, the state detection unit 154 determines that the abnormality handling process should be performed if the field of view of the one of the first and second cameras 11 and 12 has been continuously obstructed by the obstruction for at least the predetermined time. Accordingly, the state detection unit 154 requests the controller 151 to perform the abnormality handling process on condition that the field of view of the one of the first and second cameras 11 and 12 has been continuously obstructed by the obstruction for at least the predetermined time. Consequently, it is possible for the controller 151 to perform the abnormality handling process in a timely manner.

Moreover, in the present embodiment, the controller 151 inhibits the second lighting device 14 from illuminating the second field of view R2 when the first camera 11 captures images within the first field of view R1 with the first lighting device 13 illuminating the first field of view R1. Consequently, it is possible to reliably prevent the illumination by the second lighting device 14 from interfering with the capturing of images within the first field of view R1 by the first camera 11.

Similarly, the controller 151 inhibits the first lighting device 13 from illuminating the first field of view R1 when the second camera 12 captures images within the second field of view R2 with the second lighting device 14 illuminating the second field of view R2. Consequently, it is possible to reliably prevent the illumination by the first lighting device 13 from interfering with the capturing of images within the second field of view R2 by the second camera 12.

(Operation of Occupant Detection Apparatus)

Hereinafter, operation of the occupant detection apparatus 10 according to the present embodiment will be described with reference to FIGS. 3-5.

Figure 3:
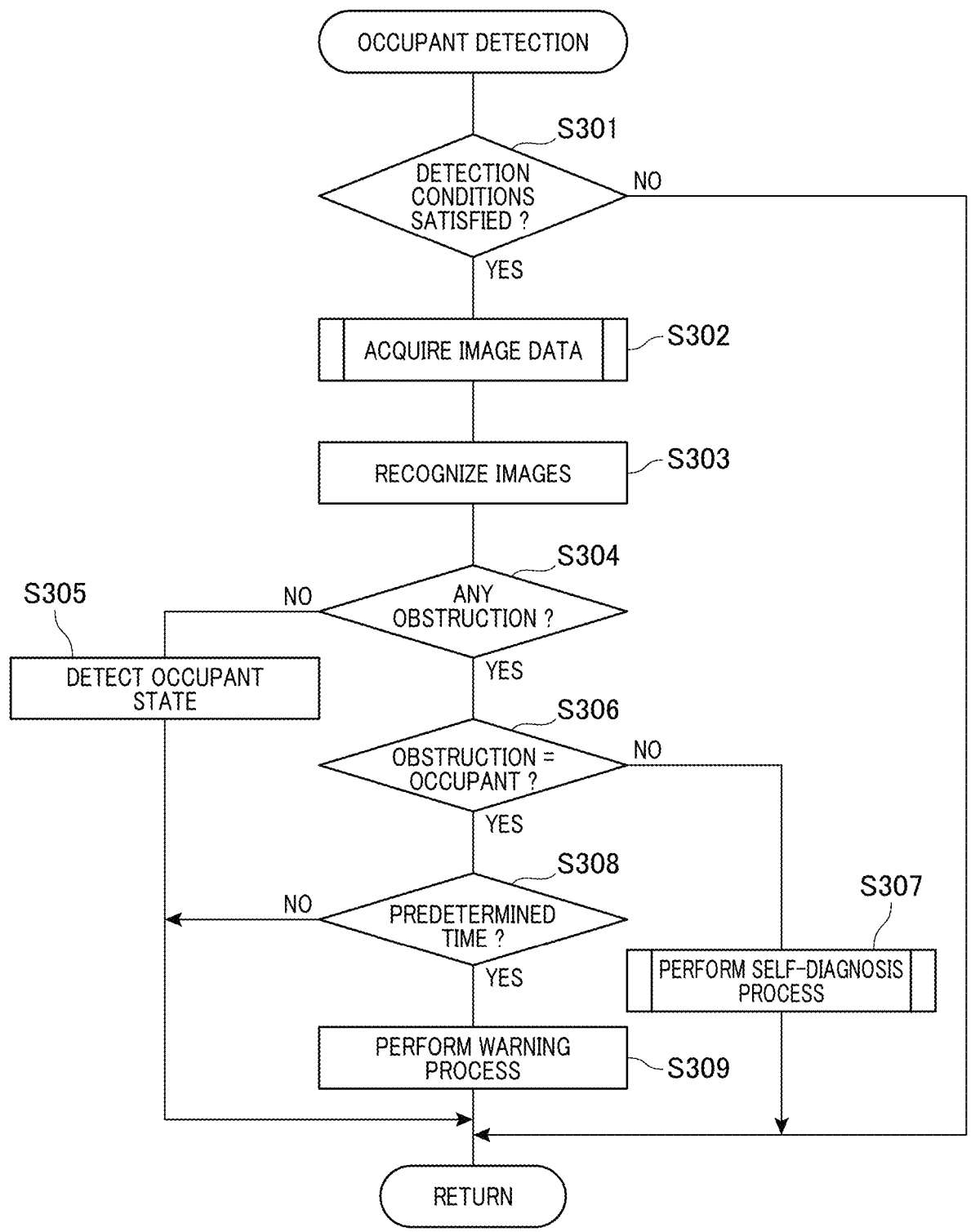
FIG. 3 is a flowchart illustrating an occupant detection process performed by an occupant detection ECU of the occupant detection apparatus.

In the present embodiment, upon an ignition switch (not shown) of the vehicle 1 being turned on, the occupant detection ECU 15 repeatedly performs an occupant detection process as shown in FIG. 3 at predetermined intervals.

Upon start of the occupant detection process, first, in step S301, the controller 151 of the occupant detection ECU 15 determines whether or not predetermined detection conditions are satisfied.

In addition, the predetermined detection conditions include, for example, that: (1) all doors of the vehicle body 2 are closed; and (2) the traveling speed of the vehicle 1 is higher than a predetermined speed (e.g., 0 km/h).

If the determination in step S301 results in a "NO" answer, i.e., if the predetermined detection conditions are not satisfied, the controller 151 terminates the process.

In contrast, if the determination in step S301 results in a "YES" answer, i.e., if the predetermined detection conditions are satisfied, the process proceeds to step S302.

Figure 4:
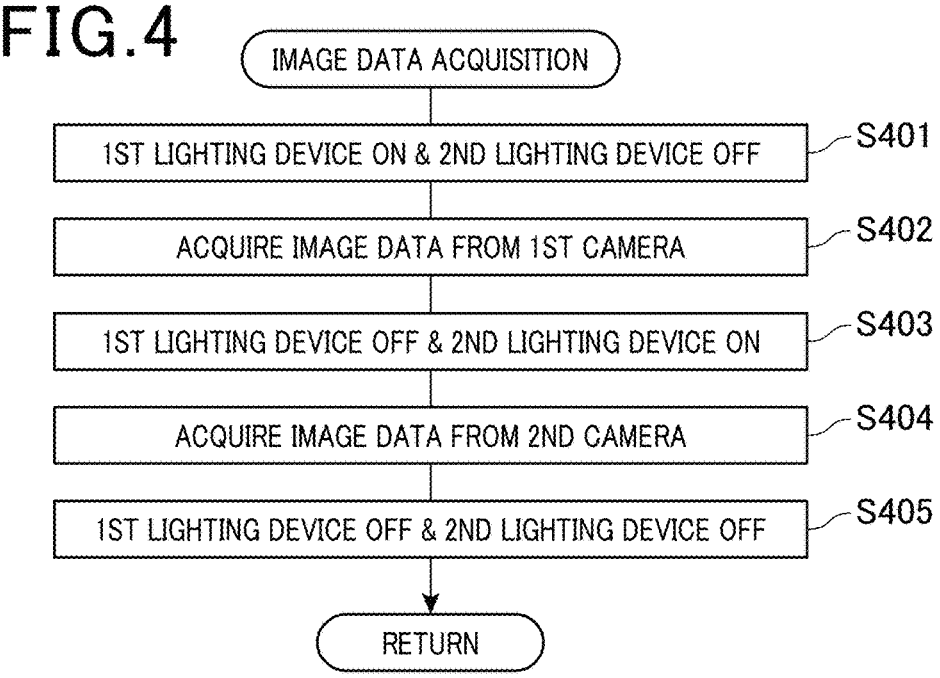
FIG. 4 is a flowchart illustrating an image data acquisition process performed by the occupant detection ECU.

In step S302, the occupant detection ECU 15 performs an image data acquisition process as shown in FIG. 4, thereby acquiring the image data from the first and second cameras 11 and 12. The image data acquisition process will be described in detail later.

In step S303, the image recognition unit 153 of the occupant detection ECU 15 recognizes the images captured by the first and second cameras 11 and 12 by processing the image data acquired in step S302.

In step S304, the state detection unit 154 of the occupant detection ECU 15 determines, based on the results of the image recognition in step S303, whether or not there is any obstruction obstructing the field of view of the first camera 11 or the second camera 12.

If the determination in step S304 results in a "NO" answer, i.e., if there is no obstruction obstructing the field of view of the first camera 11 or the second camera 12, the process proceeds to step S305.

In step S305, the state detection unit 154 detects, based on the results of the image recognition in step S303, the occupant state at each of the front and rear seats 5 and 6 of the vehicle 1. Then, the controller 151 terminates the process.

On the other hand, if the determination in step S304 results in a "YES" answer, i.e., if there is any obstruction obstructing the field of view of the first camera 11 or the second camera 12, the process proceeds to step S306.

In step S306, the state detection unit 154 determines whether or not the obstruction is caused by an occupant in the passenger compartment 3.

If the determination in step S306 results in a "NO" answer, i.e., if the obstruction is not caused by an occupant in the passenger compartment 3, the process proceeds to step S307.

Figure 5:
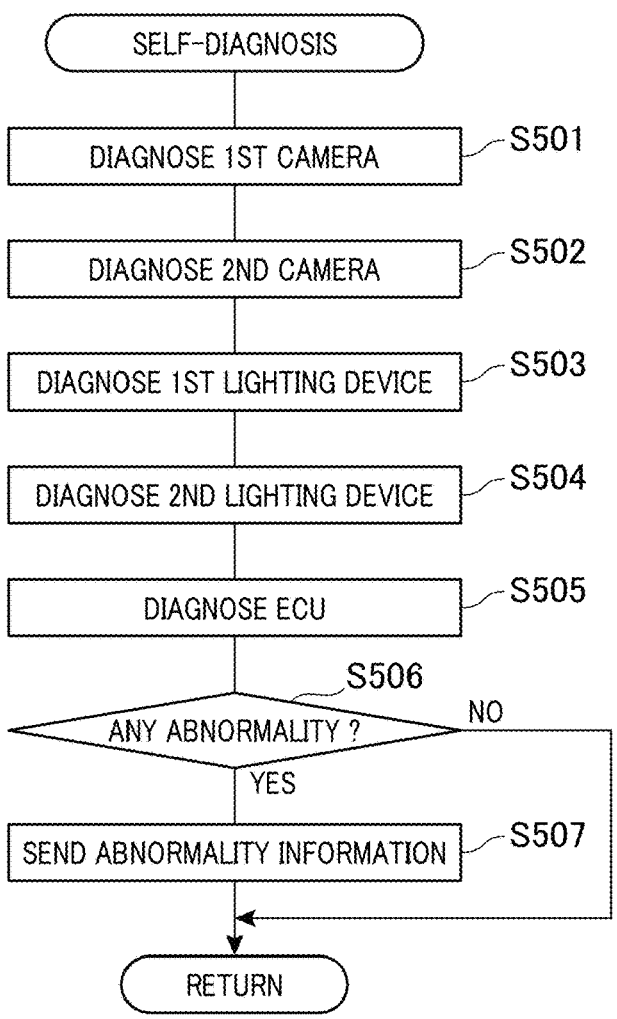
FIG. 5 is a flowchart illustrating a self-diagnosis process of the occupant detection apparatus performed by the occupant detection ECU.

In step S307, the controller 151 performs the self-diagnosis process of the occupant detection apparatus 10 as shown in FIG. 5. Moreover, in this step, the controller 151 stores, in the RAM or the nonvolatile RAM of the microcomputer constituting the occupant detection ECU 15, information indicating that the field of view of the first camera 11 or the second camera 12 is obstructed by the obstruction that is not caused by an occupant in the passenger compartment 3. Thereafter, the controller 151 terminates the process.

On the other hand, if the determination in step S306 results in a "YES" answer, i.e., if the obstruction is caused by an occupant in the passenger compartment 3, the process proceeds to step S308.

In step S308, the state detection unit 154 further determines whether or not the field of view of the first camera 11 or the second camera 12 has been continuously obstructed by the obstruction for at least the predetermined time.

If the determination in step S308 results in a "NO" answer, i.e., if the field of view of the first camera 11 or the second camera 12 has not been continuously obstructed by the obstruction for at least the predetermined time, the controller 151 terminates the process.

In contrast, if the determination in step S308 results in a "YES" answer, i.e., if the field of view of the first camera 11 or the second camera 12 has been continuously obstructed by the obstruction for at least the predetermined time, the process proceeds to step S309.

In step S309, the controller 151 performs the warning process as the abnormality handling process.

Specifically, in this step, the controller 151 outputs abnormality information to the information notification ECU 202; the abnormality information indicates that the field of view of the first camera 11 or the second camera 12 has been continuously obstructed for at least the predetermined time by the obstruction that is caused by an occupant in the passenger compartment 3. Upon receipt of the abnormality information, the information notification ECU 202 causes the information notification apparatus 22 to output, through the display mechanism and/or the audio output mechanism, a warning such as "do not obstruct the camera with your hand".

After step S309, the controller 151 terminates the occupant detection process.

Next, the image data acquisition process, which corresponds to step S302 of the occupant detection process shown in FIG. 3, will be described with reference to FIG. 4.

Upon start of the image data acquisition process, first, in step S401, the controller 151 turns the first lighting device 13 on, thereby causing the first lighting device 13 to illuminate the first field of view R1. At the same time, the controller 151 turns the second lighting device 14 off, thereby inhibiting the second lighting device 14 from illuminating the second field of view R2.

In step S402, the controller 151 causes the first camera 11 to capture images within the first field of view R1, and controls the image acquisition unit 152 to acquire from the first camera 11 the image data indicative of the images captured by the first camera 11.

In step S403, the controller 151 turns the first lighting device 13 off, thereby inhibiting the first lighting device 13 from illuminating the first field of view R1. At the same time, the controller 151 turns the second lighting device 14 on, thereby causing the second lighting device 14 to illuminate the second field of view R2.

In step S404, the controller 151 causes the second camera 12 to capture images within the second field of view R2, and controls the image acquisition unit 152 to acquire from the second camera 12 the image data indicative of the images captured by the second camera 12.

In step S405, the controller 151 turns both the first and second lighting devices 13 and 14 off, thereby inhibiting them from illuminating the first and second fields of view R1 and R2.

After step S405, the controller 151 terminates the image data acquisition process.

Next, the self-diagnosis process of the occupant detection apparatus 10, which corresponds to step S307 of the occupant detection process shown in FIG. 3, will be described with reference to FIG. 5.

In addition, the self-diagnosis process is performed not only in step S307 of the occupant detection process shown in FIG. 3, but also at predetermined timing (e.g., the timing at which the ignition switch of the vehicle 1 is turned on).

Upon start of the self-diagnosis process, first, in step S501, the controller 151 diagnoses whether or not any abnormality has occurred in the first camera 11.

In step S502, the controller 151 diagnoses whether or not any abnormality has occurred in the second camera 12.

In addition, the self-diagnosis process is activated by the execution of step S307 of the occupant detection process shown in FIG. 3. As described previously, in step S307 of the occupant detection process shown in FIG. 3, the information, which indicates that the field of view of the first camera 11 or the second camera 12 is obstructed by the obstruction that is not caused by an occupant in the passenger compartment 3, is stored in the RAM or the nonvolatile RAM of the microcomputer constituting the occupant detection ECU 15. Therefore, the determination of the presence or absence of any obstruction not caused by an occupant in the passenger compartment 3, which constitutes part of the diagnosis in each of steps S501 and S502, can be made by referring to the information stored in the RAM or the nonvolatile RAM.

In step S503, the controller 151 diagnoses whether or not any abnormality has occurred in the first lighting device 13.

In step S504, the controller 151 diagnoses whether or not any abnormality has occurred in the second lighting device 14.

In step S505, the controller 151 diagnoses whether or not any abnormality has occurred in the occupant detection ECU 15.

In addition, abnormalities that may occur in the occupant detection ECU 15 include, for example, abnormalities of input/out interfaces between the occupant detection ECU 15 and the first and second cameras 11 and 12 and the first and second lighting devices 13 and 14.

In step S506, the controller 151 determines whether or not any abnormality has been detected in steps S501-S505.

If the determination in step S506 results in a "NO" answer, i.e., if no abnormality has been detected in steps S501-S505, the controller 151 terminates the self-diagnosis process.

In contrast, if the determination in step S506 results in a "YES" answer, i.e., if any abnormality has been detected in steps S501-S505, the process proceeds to step S507.

In step S507, the controller 151 sends abnormality information to other ECUs provided in the vehicle 1 which utilize the occupant detection results, such as the occupant protection ECU 201. The abnormality information indicates, for example, the detection of an abnormality in the occupant detection apparatus 10 and the details of the detected abnormality. Moreover, the controller 151 also stores the abnormality information in the RAM or the nonvolatile RAM of the microcomputer constituting the occupant detection ECU 15.

After step S507, the controller 151 terminates the self-diagnosis process.

In addition, upon receipt of the abnormality information, the occupant protection ECU 201 performs an abnormality handling process of the ECU 201. Specifically, as the abnormality handling process, the occupant protection ECU 201 fixes control of airbags and/or belt pretensioners to operating-side control or non-operating-side control. That is, the occupant protection ECU 201 maintains current control of these devices. Moreover, the occupant protection ECU 201 sends to the information notification ECU 202 abnormality handling information that indicates the execution of the abnormality handling process. Upon receipt of the abnormality handling information, the information notification ECU 202 causes the information notification apparatus 22 to perform a predetermined warning process, such as turning on a warning light provided in the instrument panel of the vehicle 1.

While the above particular embodiment has been shown and described, it will be understood by those skilled in the art that various modifications, changes, and improvements may be made without departing from the spirit of the present disclosure.

For example, in the above embodiment, the vehicle 1 has the pair of front seats 5 consisting of the driver's seat and the front passenger seat and the single rear seat 6 on which two or three occupants can be seated. However, the vehicle 1 may alternatively have a single front seat 5, e.g., a so-called "bench seat" into which the driver's seat and the front passenger seat are integrated. Moreover, the vehicle 1 may alternatively have a plurality of separate rear seats 6 on which a plurality of occupants can respectively seated.

Figure 6:
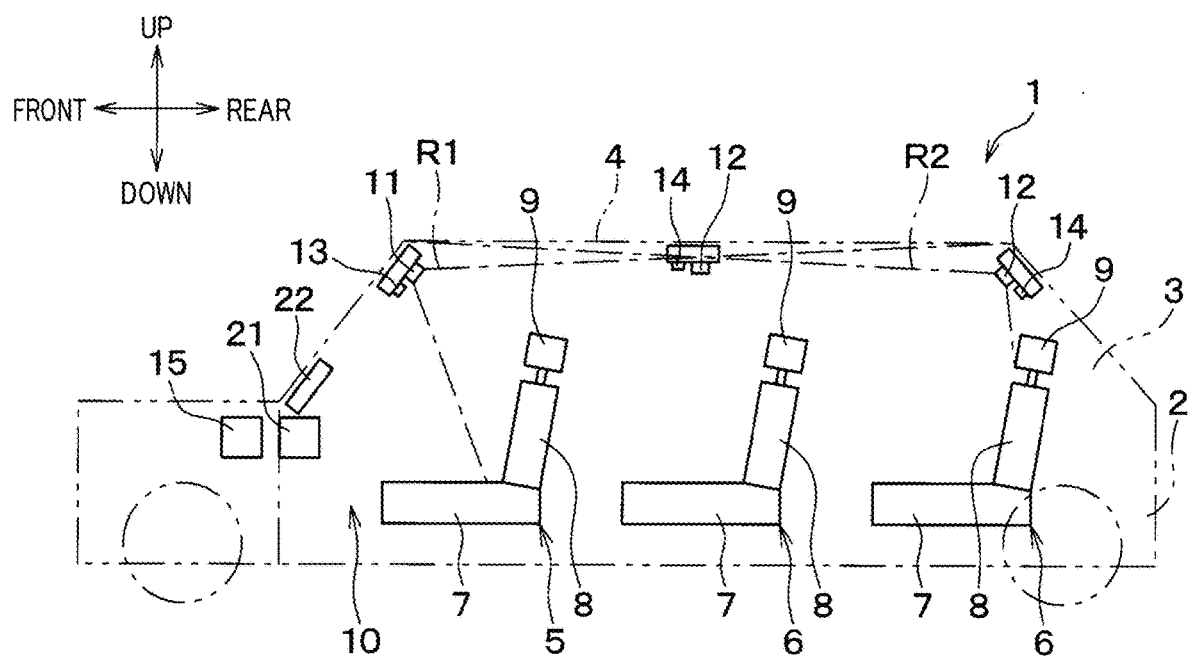
FIG. 6 is a schematic side view illustrating the overall configuration of a vehicle that is equipped with an occupant detection apparatus according to a modification.

Furthermore, as shown in FIG. 6, the vehicle 1 may alternatively have a plurality (e.g., two) of rows of rear seats 6. In this case, the occupant detection apparatus 10 may preferably include a plurality of second cameras 12 each of which corresponds to one of the rows of rear seats 6. In addition, in this case, the second camera(s) 12 arranged above a rear seat 6 of a non-rearmost row may be implemented by a fisheye camera whose field of view includes the first camera 11 and/or the other second camera(s) 12.

As another alternative, the vehicle 1 may have no rear seat 6. In this case, the second camera 12 may be arranged above the seat bases 7 or the head rests 9 of the front seats 5.

The occupant detection apparatus 10 may have a different number of first cameras 11 and a different number of second cameras 12 from those described in the above embodiment. Moreover, the occupant detection apparatus 10 may have different arrangements of the first and second cameras 11 and 12 from those described in the above embodiment.

Each of the first and second cameras 11 and 12 may be implemented by a visible-light camera (or image sensor) or an infrared camera (or image sensor).

The occupant detection apparatus 10 may be used not only for the drive control of the occupant protection apparatus 21, but also for other purposes. For example, the occupant detection apparatus 10 may also be used for warning an occupant in a state of not wearing a seat belt and for notifying whether or not there is an infant on the vehicle 1. In addition, the detection conditions in step S301 of the occupant detection process shown in FIG. 3 may be suitably changed according to the use of the occupant detection apparatus 10.

The operation and processes of the occupant detection apparatus 10 may be suitably modified.

For example, in the occupant detection process shown in FIG. 3, if the determination in step S306 results in a "NO" answer, i.e., if the obstruction is not caused by an occupant in the passenger compartment 3, the controller 151 may perform, in step S307, the warning process (i.e., the abnormality handling process) instead of the self-diagnosis process.

Moreover, in step S309 of the occupant detection process, the controller 151 may perform, as the abnormality handling process, a process of sending the abnormality information to other ECUs provided in the vehicle 1 which utilize the occupant detection results, such as the occupant protection ECU 201. In addition, in this case, the abnormality information indicates that the field of view of the first camera 11 or the second camera 12 has been continuously obstructed for at least the predetermined time by the obstruction that is caused by an occupant in the passenger compartment 3.

What is claimed is:

1. An occupant detection apparatus comprising:
   a first camera arranged in a passenger compartment of a vehicle to capture images within a first field of view in the passenger compartment;

a second camera arranged at a different position in the passenger compartment from the first camera to capture images within a second field of view in the passenger compartment, the second field of view being different from the first field of view;

an image recognizer provided to recognize the images captured by the first and second cameras;

a state detector provided to detect, based on results of image recognition by the image recognized, an internal state of the passenger compartment; and a controller provided to control operation of the occupant detection apparatus, wherein the first camera is arranged within the second field of view which is a field of view of the second camera, the second camera is arranged within the first field of view which is a field of view of the first camera, and the state detector is configured to:
  detect an obstruction, which obstructs the field of view of one of the first and second cameras, based on the results of the image recognition by the image recognizer of the images captured by the other of the first and second cameras; and
  request, when the obstruction is not caused by an occupant in the passenger compartment, the controller to perform a self-diagnosis process of the occupant detection apparatus of an abnormality handling process.

2. The occupant detection apparatus as set forth in claim 1, wherein the first camera is arranged in a front part of the passenger compartment in a longitudinal direction of the vehicle to have a front seat and part of a rear seat of the vehicle included in the first field of view, and the second camera is arranged above the rear seat and on a rear side of the first camera in the longitudinal direction of the vehicle to have a seat base of the rear seat included in the second field of view.

3. The occupant detection apparatus as set forth in claim 1, further comprising:

a first lighting device provided to illuminate the first field of view;

a second lighting device provided to illuminate the second field of view; and a controller provided to control operation of the first and second lighting devices, wherein the controller is configured to:
  inhibit the second lighting device from illuminating the second field of view when the first camera captures images within the first field of view with the first lighting device illuminating the first field of view; and
  inhibit the first lighting device from illuminating the first field of view when the second camera captures images within the second field of view with the second lighting device illuminating the second field of view.

4. The occupant detection apparatus as set forth in claim wherein the state detector is further configured to request, when the obstruction is caused by an occupant in the passenger compartment, the controller to perform the abnormality handling process on condition that the field of view of the one of the first and second cameras has been continuously obstructed by the obstruction for at least a predetermined time.

* * * * *